United States Patent [19]

Hafer et al.

[11] Patent Number: 5,070,523

[45] Date of Patent: Dec. 3, 1991

[54] PRIVATE AUTOMATIC BUSINESS EXCHANGE

[75] Inventors: George F. Hafer; Lanham P. Rattan, both of Montrose, Colo.

[73] Assignee: Da-Tel Research Co., Inc., Montrose, Colo.

[21] Appl. No.: 355,413

[22] Filed: May 22, 1989

[51] Int. Cl.⁵ .............................................. H04M 11/00
[52] U.S. Cl. ........................................ 379/94; 379/97; 379/102
[58] Field of Search ............... 379/94, 107, 93, 96, 379/97, 98, 161

[56] References Cited

U.S. PATENT DOCUMENTS

| | | | |
|---|---|---|---|
| 4,121,053 | 10/1978 | Dick | 379/97 |
| 4,578,534 | 3/1986 | Shelley | 379/93 |
| 4,640,988 | 2/1987 | Robinton | 379/93 |
| 4,654,869 | 3/1987 | Smith et al. | 379/93 |
| 4,720,851 | 1/1988 | Smith | 379/107 |
| 4,788,714 | 11/1988 | Hashimoto | 379/102 |
| 4,805,210 | 2/1989 | Griffith, Jr. | 379/161 |
| 4,862,493 | 8/1989 | Venkataraman et al. | 379/107 |
| 4,953,199 | 8/1990 | Hoshi et al. | 379/97 |

Primary Examiner—James L. Dwyer
Assistant Examiner—Stella L. Woo

[57] ABSTRACT

The invention interfaces a two-wire line to many smart terminals, modems or telephones only one of which is in use at a time. The invention is used by electric utilities in substations to automatically transfer stored data originating in the substation to a central control room.

1 Claim, 2 Drawing Sheets

PRIVATE AUTOMATIC BUSINESS EXCHANGE

BACKGROUND OF THE INVENTION

This invention relates to the problem that public utilities have an unattended electric power substations in gaining telephone access to multiple telephone handsets and/or auto-dial/auto-answer modem-equipped devices. In the past separate telephone lines were used for each telephone handset and/or auto-dial/auto-answer modem-equipped device. Our invention, an exchange, connects one public-switched telephone line and multiple output ports for interconnection to the telephone handsets and/or auto-dial/auto-answer modem-equipped devices. This invention allows the calling station to select which handset or device is to be connected and rung by entering a dual-tone multi-frequency code. In the absence of a device selection code the default port number one will be connected and rung which typically would be the telephone handset. This invention makes possible a planned priority of use of the public telephone line by the connected devices.

SUMMARY OF THE INVENTION

An object of our invention is to interface a public switched telephone line to multiple telephone handsets and/or auto-dial/auto-answer modem-equipped devices which are FCC part 68 approved, that is, designed to terminate the public telephone network.

An object of our invention is to allow a dual-tone multi-frequency code, transmitted after the initial dialing of the exchange through the telephone network, to indicate the desired port and associated telephone handset and/or auto-dial/auto-answer modem-equipped device to be connected and rung.

An object of this invention is to allow access by the telephone handset or auto-dial/auto-answer modem-equipped device at any time to the public switched telephone network if the exchange is not in use at the time the call is placed.

An object of this invention is to establish priority of use of the public telephone line among connected devices.

These and other objects and advantages will become apparent from the following description when taken with the accompanying drawings which illustrate one embodiment of the invention, it being understood that the description is not to be construed as restricting the scope of the invention beyond the terms of the claims appended hereto.

DETAILED DESCRIPTION OF PREFERRED EMBODIMENT

Figure 1:
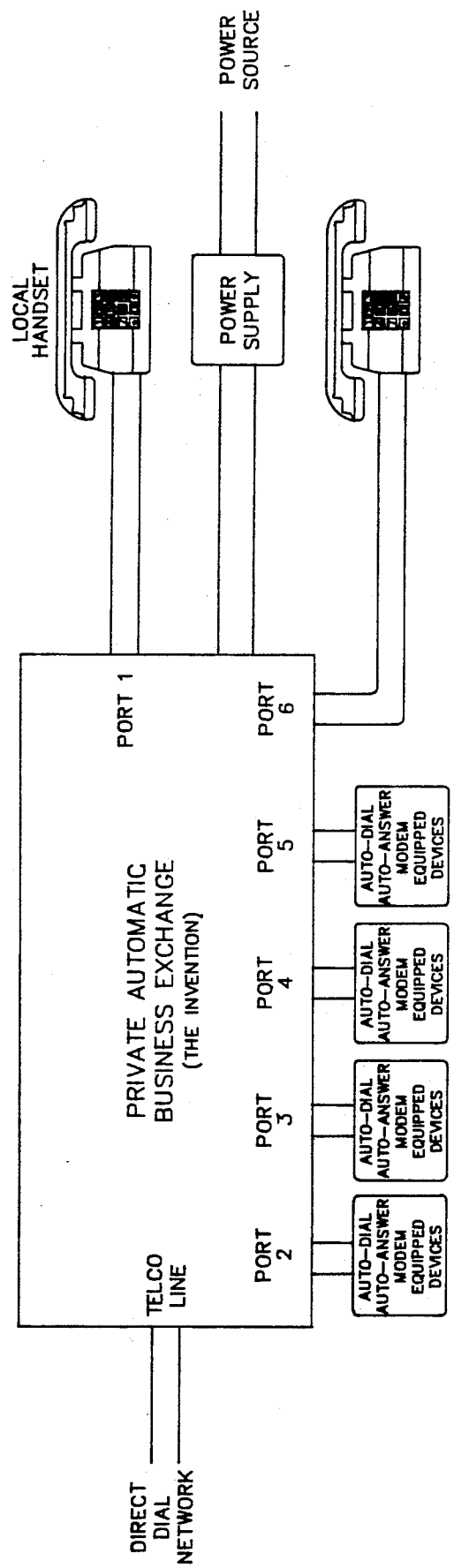
FIG. 1 shows a block diagram of an embodiment of the invention we have selected to describe. It shows the invention interfacing a two-wire direct-dial public switched telephone line to two standard telephones and four auto-dial/auto-answer modem.

In the drawings wherein like reference characters identify like parts in the views:

The exchange of FIG. 1 interfaces a two-wire public telephone line to two standard telephones and four auto-dial/auto-answer modem devices. The telephone handset on port number one has been selected for priority of use over the remaining ports in that if the telephone handset goes off-hook, any auto-dial/auto-answer modem-equipped device that is connected to the exchange will be disconnected.

The microprocessor program controls the priority of use of the telephone line. By changing the microprocessor chip which has the program stored in it, we could have selected, for example, that port 1, the local telephone, have priority except if port 2 was in use. These and other planned priority arrangements are available in our invention and are needed by power companies to protect the flow of critical data.

All ports are physically identical and, disregarding priorities, any combination of telephones and other devices can be plugged into the ports in any order provided they are designed to terminate the public telephone line individually.

Six ports were chosen to describe the invention. Ports are added by increasing output circuits with supporting changes in the microprocessor program.

Figure 2:
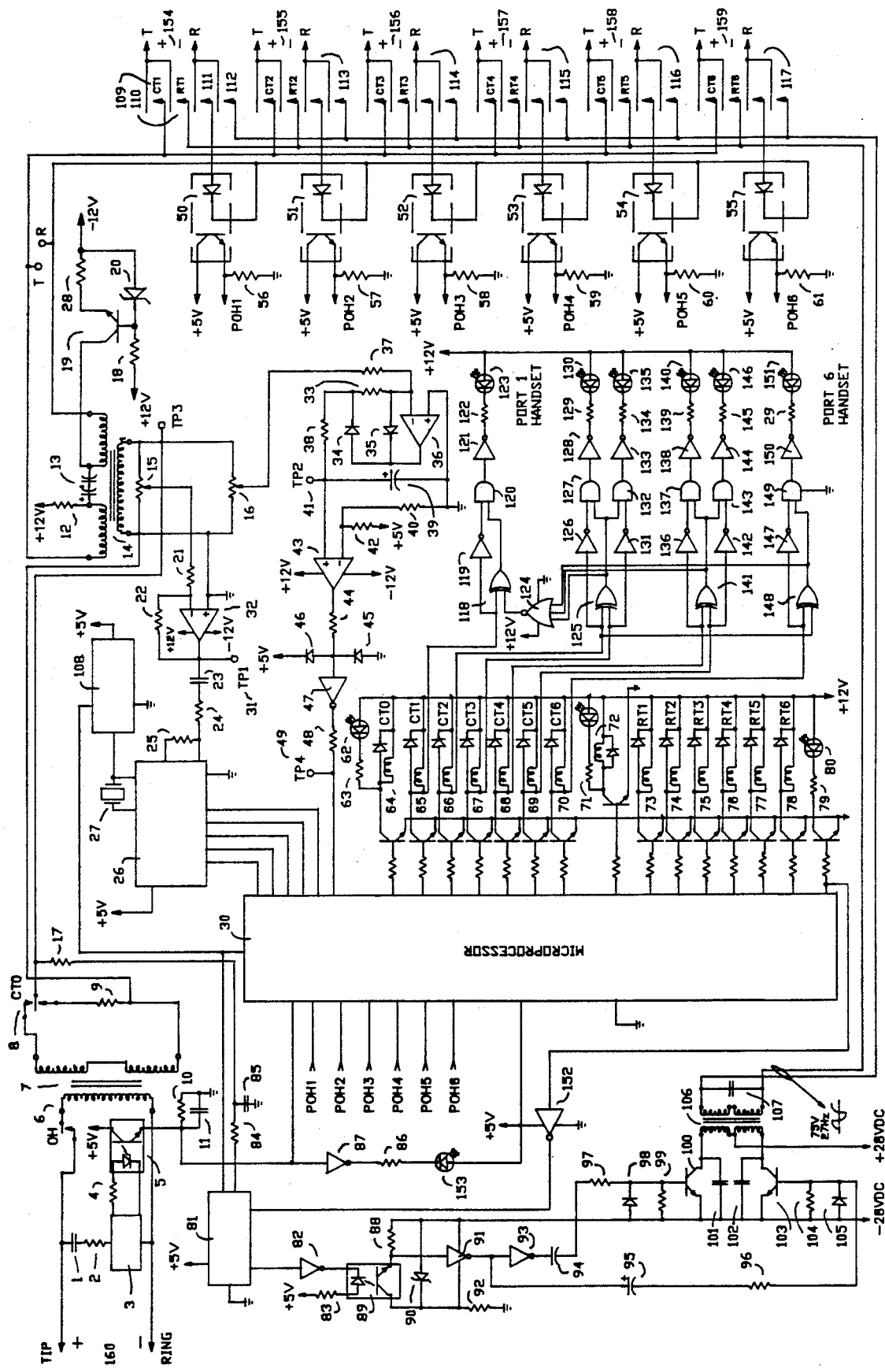
FIG. 2 is a schematic diagram showing the component parts and connections in a practical embodiment of our invention.

FIG. 2 is a diagram showing the component parts of a practical embodiment of our invention. A two-wire telephone line from the public dial-up telephone network can be plugged into the input port 160. In the on-hook, unused condition contact 6 is open and 48 Vdc appears across the port when the invention is interfacing the public telephone network. An incoming call is initiated by a low frequency ring signal from the central station. Capacitor 1 and resistor 2 couple this signal to the ring detector 3. Resistor 4 limits the output current of the detector through the optical coupler 5 diode. The transistor of optical coupler 5 is isolated from the telephone line and applies a ring pulse to resistor 10 and filter capacitor 11. This ring pulse lights a panel, LED 153, to show that a call is coming in through amplifier 87 and resistor 86. The ring pulse across resistor 10 is also applied to one of the inputs of microprocessor 30 that is programmed o recognize the pulse and close the OH contact 6 using the transistor and relay group 72. The resistor and front panel LED 71 indicates the position of contact 6. The closure of contact 6 establishes a dc loop current in the public telephone network that turns off the ring signal and connects audio signals to port 160. The microprocessor 30 counts and 2.0 seconds then closes CTO contact 8 using transistor and relay group 64. Resistor 63 and front panel LED 62 indicate that the invention is connected to the public telephone network and audio signals can pass through transformer 7 and are applied to the primary of transformer 14 and the potentiometers 15 and 16.

The interrogating auto-dial/auto-answer modem-equipped device at the utility control center then sends a dual-tone multi-frequency audio code signal to direct the exchange to activate the required port. Potentiometer 15 adjusts the gain of the decoder amplifier consisting of resistor 21, 22 and op-amp 32 to compensate for signal attenuation through the telephone line. The audio code signal level is adjusted to −5 dBm at test point 31. This signal is coupled to the dual-tone multi-frequency decoder through capacitor 23 and resistors 24 and 25. The decoder chip 26 outputs 4 binary coded pulses and a strobe pulse to the microprocessor 30 telling the microprocessor which output port to activate.

The 3.58 mHz quartz crystal 27 is part of an oscillator in the decoder chip 26 that sets the pulse rates in the decoding process. This 3.58 mHz frequency is divided by 4096 in chip 108 and used to set the pulse rates in the microprocessor 30. This pulse rate is further divided by chip 81 to obtain a 432 Hz ring-back signal and a 27 Hz ring signal.

After the microprocessor has received the desired port code which, for example, could be port 154, it closes contacts 109 and 111 using resistor transistor relay group 65. These contacts apply plus and minus 12 Vdc to the port leads through the winding of transformer 14. Resistor 12 and transistor 19 with emitter resistor 28 and zener diode 20 and resistor 18 regulate the current to be drawn through the port to 25 milliamperes.

The microprocessor 30, then guided by its internal program, rings the required port or telephone connected to port 154 by applying voltage to amplifier 152 and the resistor transistor group 79 to light the front panel LED 80 to indicate that local ringing is taking place. At the same time the microprocessor closes contacts 110 112 using resistor transistor relay group 73. The ring signal that appears across port 154 is a 75 V, 27 Hz voltage applied 2 seconds on and 2 seconds off. This voltage is amplified from a 27 Hz square wave voltage taken from divider chip 81 that was tuned on by amplifier 152. A 432 Hz signal is also taken from divider chip 81 and coupled to the two-wire incoming telephone line through resistor 84, capacitor 85 and resistor 17 connected to the primary winding of transformer 14. This ring-back signal is recognized by the smart terminal at the utility control room or heard by the person telephoning to indicate to them the call is being processed.

The power amplifier input for the 27 Hz, 75 V ring voltage across port 154 is amp 82, dropping resistor 83 and optical coupler 89. The amplifiers 91 and 93 with input resistor 88 is referenced to −28 Vdc via the regulator resistor 92 and the 12 V zener diode 90. Amplifier 93 drives the base of power transistor 100 through capacitor 94, resistors 97 and 99 with diode 98 limiting the reverse voltage on the base. Likewise, amplifier 91 drives the base of power transistor 103 through capacitor 95, resistors 96 and 104 with diode 105 limiting the reverse voltage on the base. Transformer 106 matches the collectors of transistors 100 and 103 to the ringing load of the smart terminal connected to port 154. Capacitor 101, 102 and 107 filter off the high frequency components of the square wave.

The on-off ringing continues for 15 rings at a cadence of 2 second ring-2 second pause. If the telephone or smart terminal does not go off-hook and answer the call, the microprocessor then opens contact 6 and goes on-hook, thus terminating the call. Normally the auto-dial/auto-answer modem-equipped device recognizes the ring signal, goes off-hook to answer and begins its handshaking communication sequences with the calling device ending with transmitting its stored data and going on-hook to terminate the call. When the auto-dial/auto-answer modem-equipped device connected to port 154 went off-hook (above), dc current flowed through the port. This was sensed by optical coupler 50 and the voltage across resistor 56 was applied to an input of the microprocessor which stopped the ringing by opening contacts 110 112.

Resistor transistor relay groups 66, 67, 68, 69 and 70 serve the same ring function for ports 155, 156, 157, 158 and 159 as group 73 does for port 154.

Optical coupler 51, 52, 53, 54, and 55 sense loop current and serve the same function for ports 155, 156, 157, 158 and 159 as optical coupler 50 does for port 154. The same use applied to resistors 57, 58, 59, 60 and 61 as to resistor 56.

The level of audio tones transmitted in the public dial-up telephone network must be less than −9 dBm. If the level goes above −9 dBm, a level detector sets an input to the microprocessor to 0.0 V, and the microprocessor opens contact 6 and removes the interface from the telephone line. Potentiometer 16 adjusts the gain of the detector so the output changes state at −9 dBm. Resistors 37 and 33 set the gain of op-amp 36. Diode 35 removes the negative going portions of audio signals and diode 34 passes the positive portion of the signal resulting in a half-wave rectified dc signal being applied to filter resistor 38 and capacitor 39. When the dc voltage at test point 41 exceeds the voltage at the junction of resistor 40 and 42, the output of op-amp 43 changes state. Resistor 44 and diodes 46 and 45 limit the voltage input to amplifier 47 to −0.5 to 5.5 V. Amplifer 47 inverts its input and applies voltage to resistor 48, and the high impedance input of the microprocessor. The resistor 48 allows test point 49 to be shorted without stressing amp 47.

The auto-dial/auto-answer modem-equipped devices connected to parts 154, 155, 156, 157, 158 and 159 can initiate a call to the utility's auto-dial/auto-answer modem-equipped device in the control room. When the invention is in its normal waiting, power-up condition, the microprocessor closes contacts 109 and 111 and all similar contact for all ports 154 to 159. The first auto-dial/auto-answer modem-equipped device that goes off-hook draws current which is sensed by the optical coupler in its loop as signaling the microprocessor that it wants access to the outgoing two-wire line. The microprocessor then removes the voltage from the other ports preventing them from coming on to the line and closes contacts 6 and 8. This establishes loop current in the public telephone network and permits the local auto-dial/auto-answer modem-equipped device to dial the desired station number and transmit its stored data. Depending on the program placed in the microprocessor, voltage can be left on a port or ports so that terminals of high priority can break into the line and remove an active auto-dial/auto-answer modem-equipped device from the line. The embodiment shown in FIG. 1 has priority given to part 154. This port is used for a standard telephone and its handset; going off-hook removes any active auto-dial/auto-answer modem-equipped device from the two-wire line. The front panel LEDs 123, 130, 135, 140, 146 and 147 indicate the active port. Since port 154 always has dc voltage across its terminals and resistor transistor group 65 is energized, the logic circuit of FIG. 1 is required to determine the active port and turn on the proper LED lamp. Logic circuits 118, 125, 141 and 148 are exclusive "OR" gates. The inputs to these gates are all low when the relays of groups 65, 66, 67 68, 69 and 70 are all energized. If one input to theses gates goes high due to an unenergized relay, the output goes high. Also if both inputs of a gate are high or both inputs are low, the output of that gate is low. Logic circuits 119, 126, 131, 136, 142 and 147 are inverting amplifiers. Logic circuits 120, 127, 132, 137, 143 and 149 are two input "AND" circuits in which both inputs must be high for a high output. Referring to the logic circuit 125 and the input connect to relay group 66, the LED 130 can light when this input is low, the output of circuit 125 is high, both inputs of "AND" 127 are high and the output of amp 128 is low. An y other combination of current in relays of group 66 and 67 will not light the LED 130. Again referring to the logic circuit 125 and the input connected to relay group 67, the LED 135 can light when this one input is low, the output of circuit 125 is high, both inputs of "AND" 132 are high, and the output of amp 133 is low. As before, any other combination of current in relays of component group 66 and 67 will not light the LED 135. A similar situation exists for logic circuits 141 and 148 and their corresponding port indicating LEDs.

With reference to logic circuit 118 and "OR" circuit 124, the three inputs to the "OR" circuit 124 are all low, and the output of the "OR" 124 and one input is high. A low on the other input connected to relay group 65, indicating port 154 activity, will light LED 123 through circuits 118, 119, 120 and 121 unless activity is being called for in another port. This allows the microprocessor to keep voltage on port 154 waiting for the telephone to go off-hook and take over the two-wire line and disconnect any other active port without lighting LED 123. LED 123 lights only is port number 154 is off-hook.

Having now described our invention in detail, various changes in the individual components and in the arrangement of the ports will become apparent to those skilled in the art. Changes of this character, which fall within the scope and spirit of the invention, are intended to be covered by the following claims.

What we claim as new and desire to secure by Letters of Patent of the United States.

1. In an interface exchange between one public switched telephone line and multiple telephone handsets and/or auto-dial/auto-answer modem-equipped devices, the combination comprised of:
   a. a ring detector that responds to the public switched telephone network ring signal of 40 to 150 V and 16 to 68 Hz;
   b. a relay for going off-hook and signaling the public switched telephone network that the exchange is off-hook by completing the dc loop of the public switched telephone network;
   c. a first transformer to electrically isolate the interface exchange from the public switched telephone network with respect to ground and dc loop currents of the public switched telephone network;
   d. a second transformer to connect the signal from the exchange to the telephone handsets and/or auto-dial/auto-answer modem-equipped devices as may be connected to the output circuits of the exchange and provide for a dc loop current to any of the telephone handsets and/or auto-dial/auto-answer modem-equipped devices on demand;
   e. a dual-tone multi-frequency tone detector for detection of dual-tone multi-frequency tones;
   f. a microprocessor circuit programmed to respond to the output pulses of the dual-tone multi-frequency tone detector and drive the indicated relays to connect the public switched telephone network to the indicated port of multiple ports, and
   to responds to the photo coupler outputs associated with the loop currents that appear at each port when a telephone handset or auto-dial/auto-answer modem-equipped device goes off-hook, and
   to respond to establish priority between use of the exchange by received or locally originated calls, and
   to respond to a call initiated at one of the ports, seal the line and operate relays to go off-hook and obtain a dial tone from the public switched telephone network for the calling telephone handset or auto-dial/auto-answer modem-equipped device to recognize before manual or automatic dialing begins, and
   to provide a two second delay time after the ring detector response before activating a relay connecting the exchange audio to the public switched telephone network;
   g. an optical coupler in the output circuit of each of multiple ports to sense the loop current drawn by that port's telephone handset or auto-dial/auto-answer modem-equipped device going off-hook and to signal the said microprocessor;
   h. a dual-tone multi-frequency tone receiver; with circuitry programmed to drive selected relays to connect the public switched telephone network to one of multiple ports;
   i. a circuit to generate a ring-back tone to indicate to the public switched telephone network that the indicated telephone handset or auto-dial/auto-answer modem-equipped device is being rung;
   j. a ring generator under the control of the said microprocessor circuitry to ring the selected port and its telephone handset or auto-dial/auto-answer modem-equipped device;
   k. a tone detector circuit that inhibits operation of the exchange if signals greater than −9 dBm are sensed at the ports;
   l. a logic network to drive display lamps to indicate the active port even though the program priority has designated another port which can be connected to the public switched telephone line if the port's telephone handset or auto-dial/auto-answer modem-equipped device goes off-hook.

* * * * *